UNITED STATES PATENT OFFICE.

FRANKLIN S. CLARK, OF CHARLESTON, SOUTH CAROLINA.

PROCESS OF REFINING PINE-OIL.

SPECIFICATION forming part of Letters Patent No. 390,454, dated October 2, 1888.

Application filed June 21, 1886. Serial No. 205,778. (Specimens.)

*To all whom it may concern:*

Be it known that I, FRANKLIN S. CLARK, of Charleston, South Carolina, have invented a new and useful Process of Refining Pine-Oil, of which the following is a full, true, and exact description.

The process herein described consists in a method of fractionally distilling and separating a body known as "pine-oil" and subsequently treating the separated portions, the said process resulting in new products separately claimed in applications filed November 10, 1887, Nos. 254,756 and 254,757.

The oil upon which the process is to be applied is pine-oil resulting from the distillation of yellow or long-leaf pine-wood, (*Pinus palustris.*) This oil has a specific gravity of .970 to 1.030, is of a deep-red to black color, and of a sirupy consistency when cold. This oil should be well separated from the aqueous distillate resulting from the distillation of the pine-wood, and then subjected to fractional distillation in an iron still over a free fire, which still may be of any of the known forms, and should be provided with a fractional separating apparatus. The object of this distillation is to separate this pine-oil into two distinct portions, the first of which is fluid and thin flowing, while the second is very viscous. In order to accomplish this result, the fire is started at about 220° Fahrenheit. The first distillate passes over. This consists of water, wood-alcohol, acetic acid, and a yellow oil. The heating is continued until water ceases to come over in the distillate. From this portion the yellow oil may be separated by gravity. The heating is continued until about forty per cent. of the original pine-oil is passed over, which will happen at a temperature of about 540°, when this portion is cut off and the portion passing off at a higher temperature is treated differently. The point of separation between this lighter and heavier oil will not be very marked in an ordinary iron still; but in a glass fractional still the rapid increase in specific gravity at 540° will readily be noticed. The fraction so obtained of from about 220° to about 540° Fahrenheit has a specific gravity of .897 and a yellow color which turns darker upon exposure to the air. It tends to thicken and resinify when exposed to the air, due probably to the absorption of oxygen. It has an unpleasant odor, due partly to phenyloid bodies, but especially to a small quantity (about four per cent.) of a volatile oil with a very penetrating and repulsive odor. In order to purify the oil, it is necessary to remove the guaiacol and creosol oils, which is effected by a thorough agitation of the above oil, which, of course, is thoroughly separated from any water with ten per cent. by volumes of a 1.1 specific gravity solution of caustic soda in the cold, either by blowing air through it or using a mechanical agitator. Agitation is kept up one-half hour, and the liquid is allowed to settle. The lower layer of caustic soda holding creosote and allied bodies is separated, and the remaining oil is ready for a further treatment in the same vessel. In order to carry out this treatment, the vessel is provided at its upper part with a delivery-pipe connected with any efficient form of fractioning apparatus, and this in turn connects with a small condenser. The contents of the agitator are now subjected to a fractional distillation to remove only the bodies which pass over at or under 300°, or as near that temperature as practicable. The heat may be supplied by a steam-coil with steam at high pressure. The result of this operation is that the oil in the agitator is to a great extent freed from the volatile and bad-smelling oil, this latter passing off through the fractioning apparatus. The strong-smelling oil thus separated leaves the oil in the agitator with a much milder odor. This volatile oil constitutes about two per cent. of the oil in the agitator, but the part rejected in the subsequent treatments will make in all about four per cent. The oil remaining in the agitator is run into a copper still supplied with a pipe and also with a perforated coil, and is here treated with two per cent. of 1.250 caustic-soda solution. The steam is applied by the tight coil to thoroughly mingle the oil and soda solution, and a small percentage of the bad-smelling oil (should any remain) may also be allowed to escape at this stage of the process. Steam is then applied through the perforated coil and a regular distillation ensues, yielding an oil slightly yellow in color and much milder in odor than the original, and at the end of the distillation is more or less turbid, due to suspended water, but clears by standing in the ordinary way. In this and the following distillations the last part of the oil driven over—say from three to four per cent.—may be separated and distilled again with the succeeding lots to be distilled. It is now again pumped into an agitator similar to the first and treated by agitation in the cold with five per cent. of 1.4 specific gravity caustic-soda solution. The agitation is kept up about one-half an hour and separation is made as before. It may now be fractioned as before, rejecting a small percentage of the evil-smelling oil, (if any there be,) and is run into a copper still, treated as before with 1.5 per cent. 1.45 specific gravity caustic soda and again distilled. It will now pass over nearly, if not quite, colorless, any turbidity disappearing on settling. It is now submitted to a last treatment in the agitator of three per cent. 1.5 caustic soda, finally distilled with one per cent. 1.6 specific gravity caustic-soda solution. If after one of the treatments in the agitator the oil is agitated with a weak sulphuric acid, it will be somewhat improved. The final product obtained is substantially water-white, free or nearly free from odor, and has but little tendency to resinify or become colored. By blowing air through as a final operation any remaining odor is removed. This oil or spirits is now capable of being applied to all the uses of turpentine.

The second portion of the original distillation of the pine-oil amounts to about fifty per cent. of the original oil. The temperature at which the operation closes is generally between 800° and 850° Fahrenheit. This body as it is received from the still is yellow, but quickly turns to yellow-red and then to crimson, and finally black. It has a blue-green fluorescence and becomes very resinous by exposure. In order to purify this body I proceed as follows: It is first treated with agitation under heat, with ten per cent. of 1.080 specific gravity caustic-soda solution, and allowed to settle. The caustic soda is separated and the oil is preferably washed with water and then agitated with ten per cent. sulphuric acid of 1.825 specific gravity under heat, and then allowed to settle. The acid is separated, and after washing with weak soda solution the oil is run into a still and subjected to distillation. There will at first pass over some water and mechanically-inclosed light oil, both of which are to be separated and rejected. The higher boiling and heavier oil will begin to distill at about 500° Fahrenheit, and will have a specific gravity of about .910, having a yellow-green color, which by oxidation changes to red and a characteristic odor. As the operation proceeds with an elevation of the temperature, viscosity and specific gravity both increase and the color becomes more yellow. The latter portions have a resinous odor and strong green bloom, and tend to solidify in the cold. The specific gravity finally reaches 1.040. The oil thus obtained is pumped in bulk into an agitator, treated with five per cent. 1.2 specific gravity caustic-soda solution, and then with four per cent. 1.835 specific gravity sulphuric acid, after which it is redistilled and yields a much better and more permanent product than before. After standing a time, however, this will darken, and therefore the last-named operation is repeated with about three and one-half per cent. of 1.2 specific gravity caustic-soda solution and three per cent. of 1.843 specific gravity sulphuric acid, and if necessary the same process may be repeated until the product is of a clear straw color, not liable to change and possessing but a slight color, which latter may be removed by blowing steam through the oil. The very last portions of each distillation are very resinous, and are preferably set aside, and the first portions of the heavy oil distillate, ranging from .91 to .96 specific gravity, oxidize quickly, and are also set aside.

What I claim as my invention, and desire to secure by Letters Patent, is—

1. The process herein described, which consists in fractionally distilling pine-oil and separating the fractions at or about 540° Fahrenheit, and in separately and subsequently treating said fractions by two or more independent and subsequent distillations and treatments with caustic soda, substantially as described.

2. The process herein described, which consists in fractionally distilling pine-oil and separating the fractions at or about 540° Fahrenheit, and in separately treating said fractions by two or more fractional distillations and treatments with caustic soda and one or more treatments with sulphuric acid, substantially as described.

FRANKLIN S. CLARK.

Witnesses:
   JOHN C. MALLONEE,
   GEORGE S. BROWN.